(12) United States Patent  
Ramanzin

(10) Patent No.: US 6,917,649 B2  
(45) Date of Patent: Jul. 12, 2005

(54) METHOD OF ENCODING VIDEO SIGNALS

(75) Inventor: Yves Ramanzin, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 495 days.

(21) Appl. No.: 09/799,829

(22) Filed: Mar. 5, 2001

(65) Prior Publication Data

US 2002/0009140 A1 Jan. 24, 2002

(30) Foreign Application Priority Data

Mar. 7, 2000 (EP) .............................. 00400603

(51) Int. Cl.$^7$ ................................ H04N 7/18
(52) U.S. Cl. ............................ 375/240.09; 375/240.15
(58) Field of Search ...................... 375/240.08–240.17

(56) References Cited

U.S. PATENT DOCUMENTS 5,936,671 A * 8/1999 Van Beek et al. ...... 375/240.14

6,400,846 B1 * 6/2002 Lin et al. .................... 382/199

* cited by examiner

Primary Examiner—Andy Rao

(57) ABSTRACT

The present invention relates to a method of encoding, which receives an input video signal (IS) for providing a compressed video data signal (CS). Said method comprises the steps of segmentation (SEG) of the input video signal for extracting the video object planes, hereafter referred to as VOP, contained in the video scene; detection (DET) of a non-visible VOP; correction (COR) for converting a bidirectionally predictive coded VOP preceding, in a display order, a non-visible intra or predictive coded VOP that has been detected (Y) by the detection step, into an intra or predictive coded VOP; encoding (ENC) the converted VOP, if a non-visible VOP has been detected by the detection step, or the regular VOP in the opposite case (N), resulting in the compressed video data signal. Use: MPEG-4 encoder.

4 Claims, 3 Drawing Sheets

METHOD OF ENCODING VIDEO SIGNALS

The present invention relates to a method of encoding an input video signal comprising a step of segmentation of the input video signal which provides at least one video object, said video object comprising at least one video object plane.

Such an encoding method may be used in, for example, MPEG-4 applications.

An encoding method is known from the MPEG-4 Visual standard, referred to as MPEG-4 Visual Version 1, ISO/IEC 14496-2.

The MPEG-4 standard uses video objects, which are entities in a scene that a user may access and manipulate. The instances of video objects at a given time are called video object planes, hereafter referred to as VOPs. A coded representation of a VOP includes representation of its shape, its motion and its texture.

Intra coded VOPs, hereafter referred to as I-VOPs, are coded without reference to other pictures. They provide access points to the coded sequence where decoding can begin, but are coded with only moderate compression. Predictive coded VOPs, hereafter referred to as P-VOPs, are coded more efficiently using motion compensated prediction from a past intra or predictive coded VOP and are generally used as a reference for further prediction. Bidirectionally predictive coded VOPs, hereafter referred to as B-VOPs, provide the highest degree of compression but require both past and future reference VOPs for motion compensation. Motion vectors are defined for each 16-sample by 16-line region of a VOP, hereafter referred to as a macro-block, or 8-sample by 8-line region of a VOP, hereafter referred to as a block, as required.

During a video sequence, a video object can be hidden by another object, go out of a picture window, or become too small to be visible and, therefore, disappears from the visual scene for a given time. Nevertheless, this non-visible video object is still part of the scene and its disappearance as its reappearance has to be signaled in the compressed video data signal.

Figure 1A:
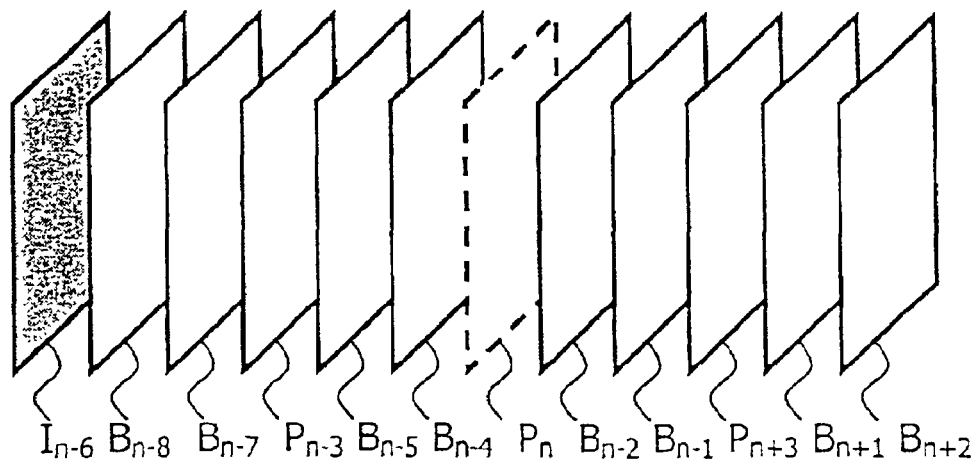
Figure 1B:
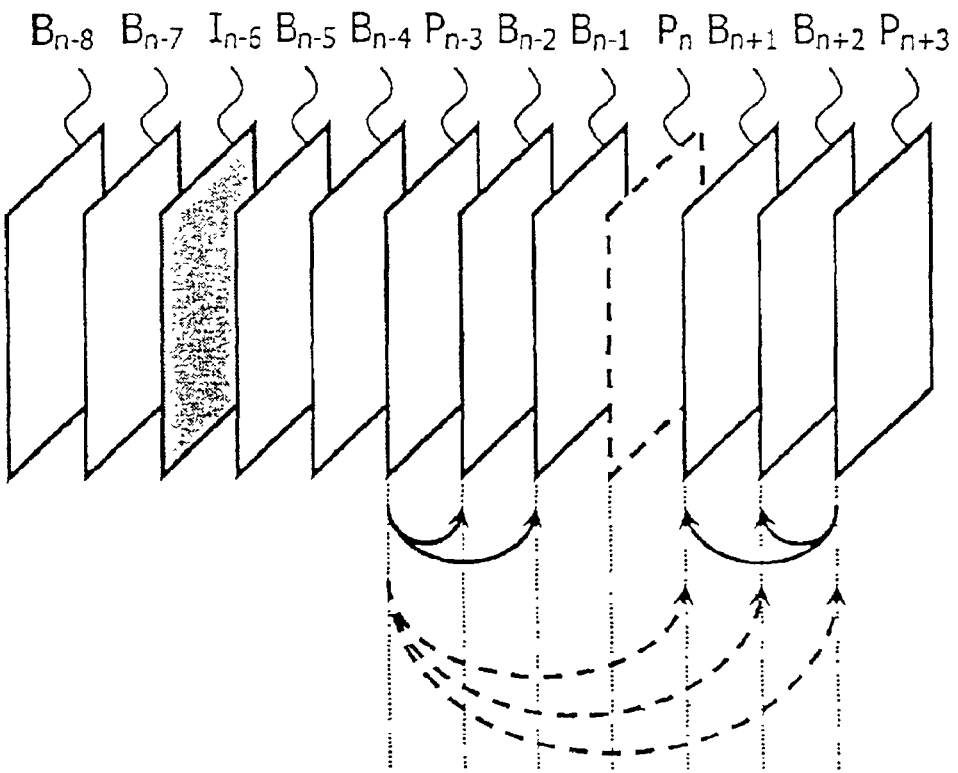

The MPEG-4 Video standard achieves this thanks to a coding indicator in the VOP header. The coding indicator named vop_coded indicates whether the VOP is really coded (vop_coded=1) or if no subsequent data exists for the VOP (vop_coded=0). A non-visible VOP cannot be used as a reference for motion compensation. In consequence, the past and future references are defined according to FIG. 1a and FIG. 1b. FIG. 1a shows a sequence of VOPs in an encoding order, where P(n) is a non-visible VOP, and FIG. 1b shows the same sequence of VOP in a display order. The VOP P(n) is represented by a dashed line.

A past reference VOP is defined as a most recently decoded I or P-VOP in the past for which vop_coded=1. It is the VOP P(n−3) for the target VOPs B(n−2), B(n−1) but also for the VOP B(n+1), B(n+2) and P(n+3), as illustrated by the arrows drawn in FIG. 1b.

A future reference VOP is defined as the most recently decoded I or P-VOP in the future, regardless of the value for vop_coded. It is the VOP P(n+3) for the target VOP B(n+1) and B(n+2). Thus, a target B-VOP can refer to:

the past and/or the future reference VOP, if for the past reference VOP vop_coded=1, only the past reference VOP, if for the future reference VOP vop_coded=0.

It is an object of the invention to achieve a more efficient encoding of the input video signal. The invention takes the following aspects into consideration.

The encoding method according to the prior art encodes a B-VOP by only using the past reference VOP if, for the future reference VOP, vop_coded=0. Such a method is not very efficient, because the encoding of such a B-VOP is similar to the encoding of a P-VOP. Compared to the coding of a P-VOP, the coding of such a B-VOP is even less efficient, because it uses a coding syntax that is more expensive. Moreover, for an implementation of the method in an encoder, the processing of B-VOPs is made more complex, as one has to differentiate the case of B-VOPs with no valid future reference from the case of regular ones.

The encoding method according to the prior art encodes also the group of VOPs comprising one I or P-VOP and B-VOP(s), and following a non-visible VOP in a display order, by using a past reference that can be far from them: P(n−3) is the past reference for B(n+1), B(n+2) and P(n+3) in the example of FIG. 1b. It makes the encoding efficiency even worse.

The method of encoding in accordance with the invention is characterized in that it comprises:

a detection step of a non-visible VOP, a correction step for converting a bidirectionally predictive coded VOP preceding, in a display order, a non-visible intra or predictive coded VOP, which has been detected by the detection step, into an intra or predictive coded VOP for being encoded.

Such an encoding method allows to encode with both past and future references a B-VOP following a non-visible VOP in an encoding order, consequently improving the coding efficiency. Moreover, the group of VOPs comprising one I or P-VOP and B-VOP(s), and following a non-visible VOP in a display order, are encoded with reference to a closer P-VOP, which further improves the coding efficiency.

The present invention also applies to a video encoder implementing such an encoding method.

These and other aspects of the invention will be apparent from and elucidated with reference to the embodiments described hereinafter.

Figure 2:
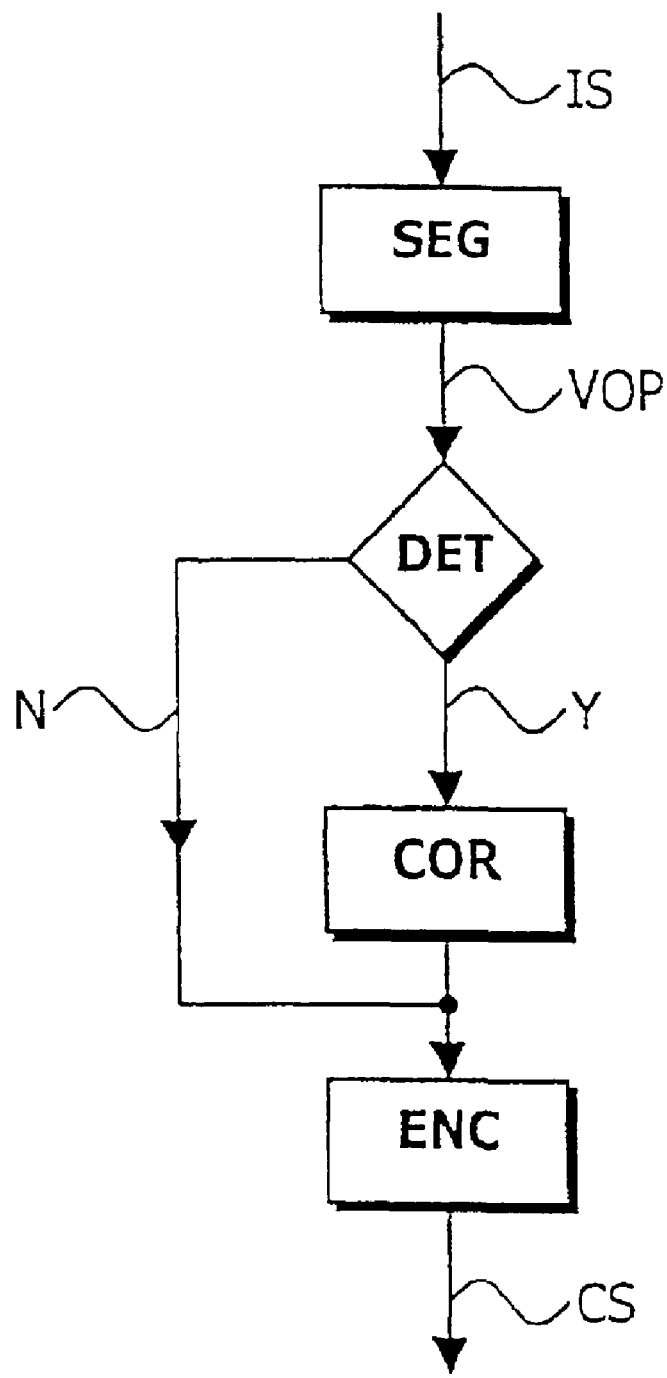
Figure 3A:
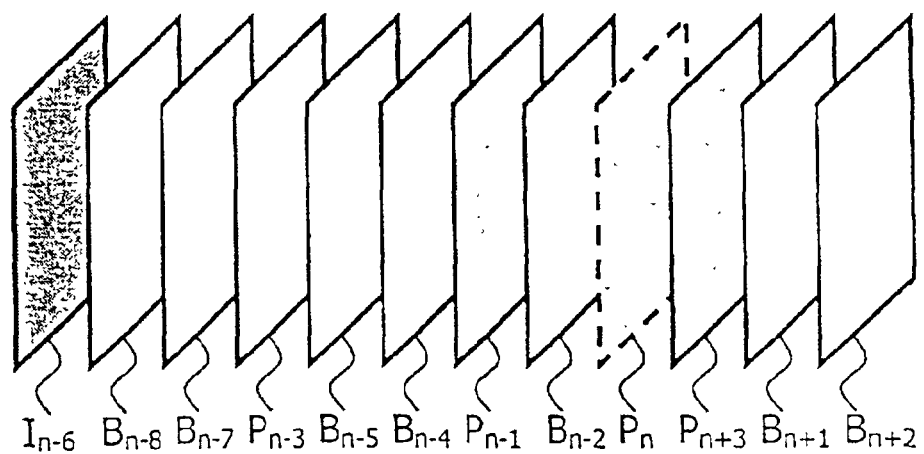
Figure 3B:
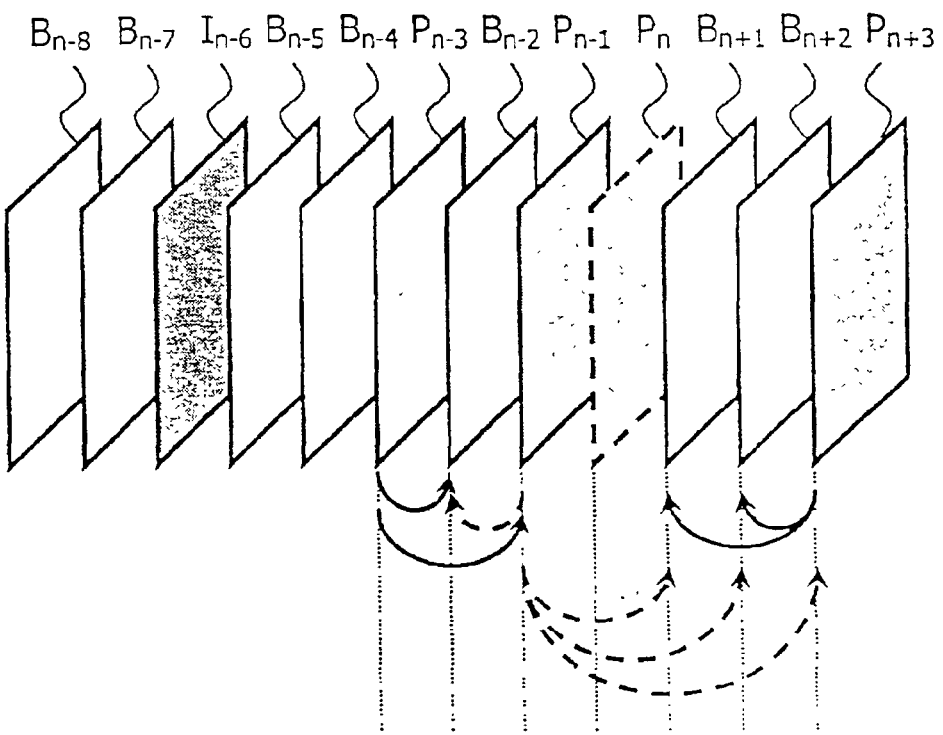

The present invention will now be described, by way of example, with reference to the accompanying drawings, wherein:

FIG. 1a represents a sequence of VOPs in an encoding order according to the prior art, FIG. 1b represents the past and future references according to the prior art, for a sequence of VOPs in a display order, FIG. 2 is a block diagram of the encoding method according to the invention, FIG. 3a represents a sequence of VOPs in an encoding order according to the invention, FIG. 3b represents the past and future references according to the invention, for a sequence of VOPs in a display order.

The principle of the encoding method in accordance with the invention is illustrated in the block diagram of FIG. 2.

The encoding method receives an input video signal (IS) for providing a compressed video data signal (CS). Said method comprises the following steps of:

segmentation (SEG) of the input video signal, for extracting the video objects contained in the video scene, said video object comprising at least one VOP, detection (DET) of a non-visible VOP, correction (COR), for converting a B-VOP preceding, in a display order, a non-visible I or P-VOP that has been detected (Y) by the detection step, into an I or P-VOP, encoding (ENC) the converted VOP, if a non-visible VOP has been detected by the detection step, or the regular VOP in the opposite case (N), resulting in the compressed video data signal.

The detection step is based on the analysis of the shape of a VOP. When an arbitrary shaped VOP is formed, if there is no macro-block containing shape data, it means that this VOP is a non-visible VOP and the size of the VOP is set to zero; the coding indicator vop_coded equals 0. The result of the detection step is Y and a correction step is applied.

As a consequence of the correction step, the past and future references are redefined according to FIG. 3a and FIG. 3b. FIG. 3a shows a sequence of VOPs in an encoding order, where P(n) is a non-visible VOP, and FIG. 3b shows the same sequence of VOPs in a display order. The VOP P(n) is represented by a dashed line. The VOPs following the non-visible VOP P(n) are now B(n−2) and P(n−1) after the correction step and according to FIG. 3a.

A past reference VOP is defined as a most recently decoded I or P-VOP in the past for which vop_coded=1. It is always the VOP P(n−3) for the target VOP B(n−2), but now it is the VOP P(n−1) for the group of VOPs B(n+1), B(n+2) and P(n+3). The VOP P(n−1) is a closer reference than the VOP P(n−3) in the prior art for the above-cited group of 3 VOPs, which improves the coding efficiency.

A future reference VOP is defined as the most recently decoded I or P-VOP in the future, regardless of the value for vop_coded. It is the VOP P(n+3) for the target VOPs B(n+1) and B(n+2), but now it is the VOP P(n−1) for the VOP B(n−2). Then, the VOP(n−2) is encoded as a real B-VOP instead of being encoded as a B-VOP with only past reference, therefore with the whole coding efficiency of bidirectional prediction, and the VOP(n−1) is encoded as a P-VOP instead of being encoded as a B-VOP with only past reference, therefore with a less expensive coding syntax than in the prior art. The encoding method is thus leading to improved coding efficiency.

A non-coded VOP is regularly processed, except that encoding stops after having written the VOP header. If the previous VOP in the display order has not yet been coded, that is vop_coded=0, the VOP is removed from the encoding chain in order to avoid encoding non-coded VOP.

Such an encoding method saves bits and encodes a non-visible VOP only once for a whole period of disappearance instead of coding it at a periodic rate and resuming coding only when the VOP is visible again.

An encoding method in accordance with the invention is implemented, for example, in an integrated circuit, which is intended to be integrated, for example, in a video encoder.

The corresponding video encoder is intended to provide an output compressed video data signal and comprises:

- segmentation means for extracting at least one video object from the input video signal, said video object comprising at least one VOP,
- a detector for detecting a non-visible VOP,
- correction means for converting a bidirectionally predictive coded VOP preceding, in a display order, a non-visible intra or predictive coded VOP, which has been detected by the detector, into an intra or predictive coded VOP for being encoded,
- a data compressor for encoding the converted VOP, if a non-visible VOP has been detected by the detector, or the regular VOP in the opposite case, resulting in the compressed video data signal.

It is possible to implement the encoding method using an integrated circuit which is suitably programmed. A set of instructions contained, for example, in a computer programming memory may cause the integrated circuit to carry out the different steps of the encoding method. The set of instructions may be loaded into the programming memory by reading a data carrier such as, for example, a disk. The set of instructions can also be made available by a service provider via a communication network such as, for example, the Internet.

Any reference sign in a claim should not be construed as limiting the claim. It is to be noted that the verb "comprise" and its conjugations does not exclude the presence of other steps or elements besides those listed in any claim. The word "a" or "an" preceding an element or step does not exclude the presence of a plurality of said elements or steps.

What is claimed is:

1. A method of encoding an input video signal comprising a step of segmentation of the input video signal, which provides at least one video object, said video object comprising at least one video object plane, hereafter referred to as VOP, characterized in that said method of encoding comprises also:
    a detection step of a non-visible VOP,
    a correction step for converting a bidirectionally predictive coded VOP preceding, in a display order, a non-visible intra or predictive coded VOP that has been detected by the detection step, into an intra or predictive coded VOP for being encoded.

2. An encoding method as claimed in claim 1, further comprising:
    a step of removing a VOP that is not visible for a second successive time, from a coding chain,
    a step of resuming the encoding when said VOP is visible again.

3. A video encoder for receiving an input video signal and comprising segmentation means for extracting at least one video object from the input video signal, said video object comprising at least one video object plane, hereafter referred to as VOP, characterized in that said encoder comprises also:
    a detector of a non-visible VOP,
    correction means for converting a bidirectionally predictive coded VOP preceding, in a display order, a non-visible intra or predictive coded VOP, which has been detected by the detector, into an intra or predictive coded VOP for being encoded.

4. A computer program product for a video encoder that comprises a set of instructions, which, when loaded into the encoder, causes the encoder to carry out the method as claimed in claim 1 or 2.

* * * * *